Patented June 10, 1930

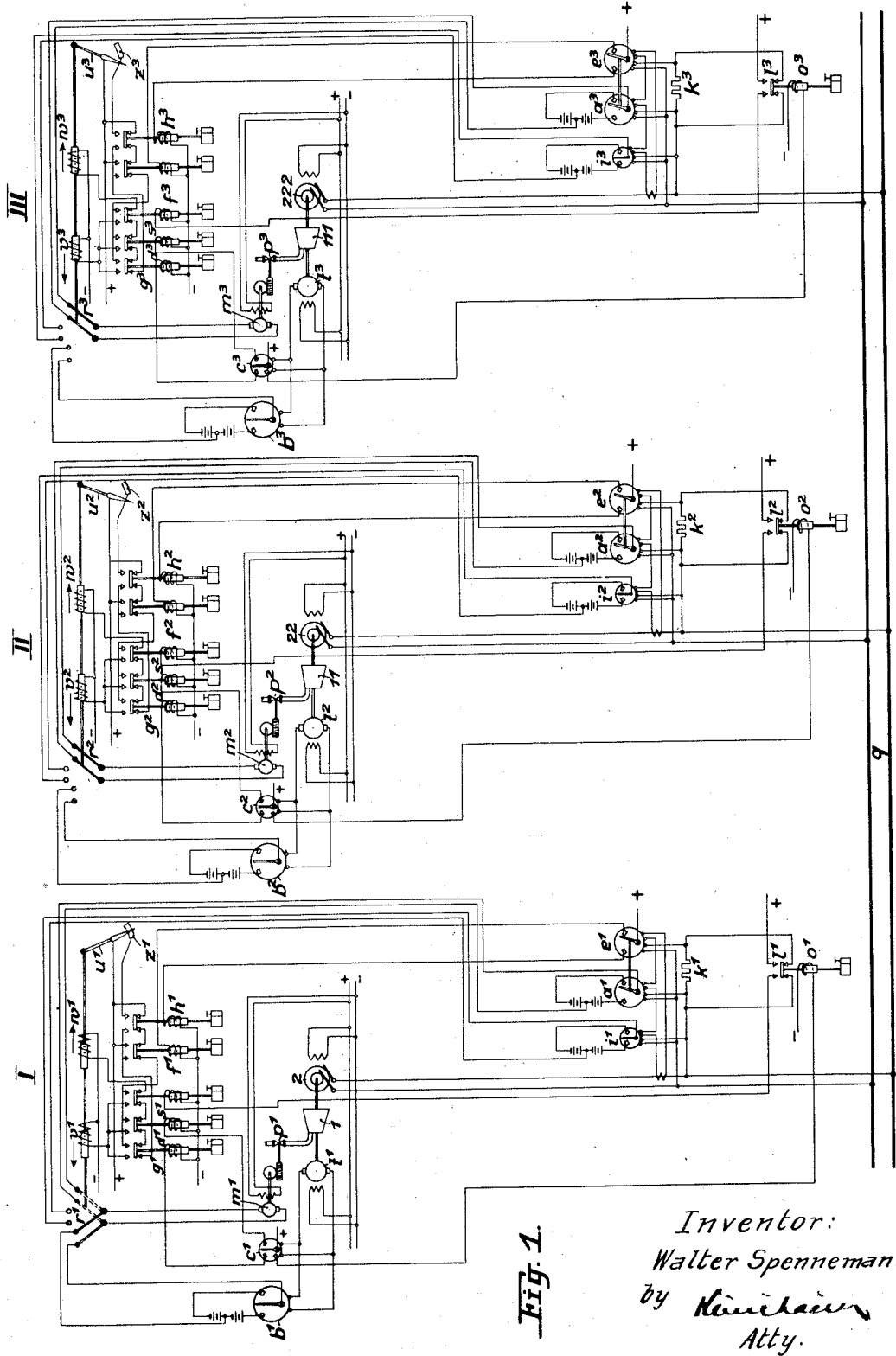

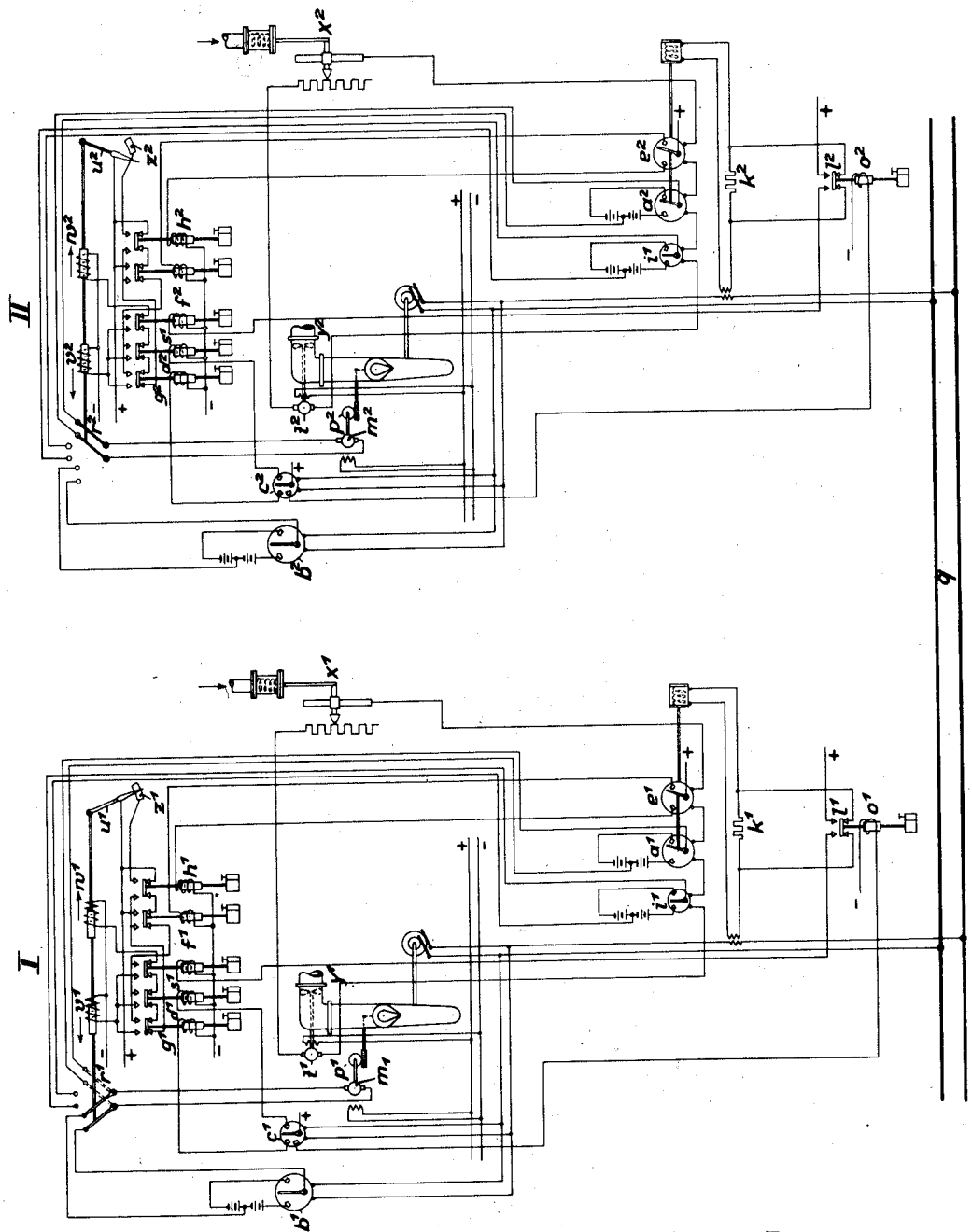

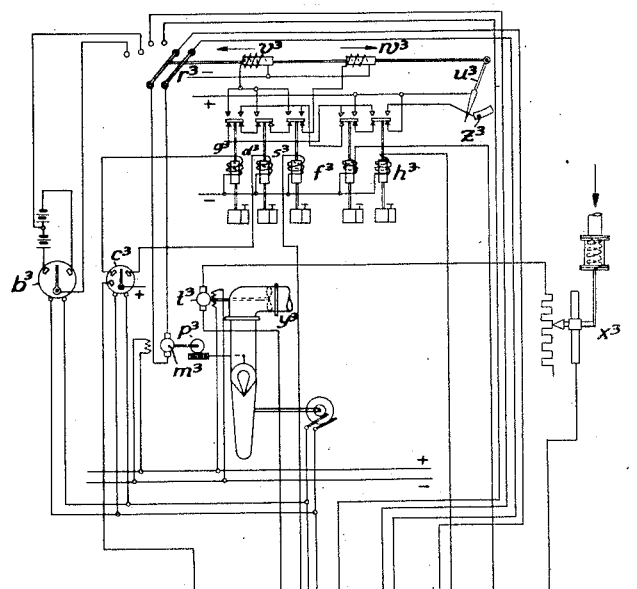
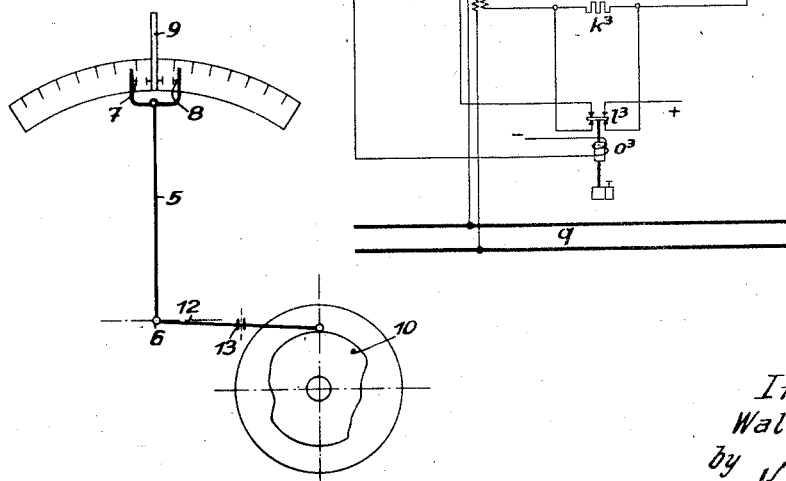

1,762,672

UNITED STATES PATENT OFFICE

WALTER SPENNEMANN, OF CASSEL, GERMANY

ELECTRIC POWER DISTRIBUTION

Application filed May 16, 1927, Serial No. 191,773, and in Germany May 22, 1926.

My invention relates to power generation by electricity and more especially to energy distribution by means of electric generators operating in parallel. Heretofore such generators were regulated exclusively by hand with the aid of speed regulators. Positive distribution of the load was attained to a certain extent by influencing the characteristics of the speed regulators, but in this method selective distribution of the load on machines operated in parallel is not guaranteed owing on the one hand to the overlapping of the characteristics of the machines and, on the other hand, to the large distances between these machines.

An absolute requirement for the selective distribution of load is that in each machine or group of machines the output be regulated independently of the number of revolutions, while the number of revolutions should be regulated independently of the output, and that such regulation be effected only in accordance with the requirements of the system as a whole.

In the drawings affixed to this specification and forming part thereof several embodiments of my invention are illustrated diagrammatically by way of example.

In the drawings,

Fig. 1 is a diagram of a distributing system comprising three steampower stations, Fig. 2 and Fig. 2ª illustrate a system comprising three high-pressure hydraulic power stations, and Fig. 3 illustrates an automatic regulating device.

Referring first to Fig. 1, I, II and III indicate three power stations which in common supply energy to the system $q$. Each station is equipped with a steam turbine (1, 11 and 111 respectively) and a generator (2, 22 and 222 respectively). Equal control devices and instruments are provided in connection with each station. The following description refers to station I: The steam turbine $l$ is supplied with steam through a pipe in which the controlling member $p^1$ automatically actuated by means of a small motor $m^1$ is inserted. On the turbine shaft is mounted the alternating current generator 2 which is connected with the net $q$ and feeds its current into the net. There is further mounted on the shaft a tachometer dynamo $t^1$, the exciting winding of which is connected to a constant direct current supply so that the voltage of the dynamo $t^1$ is proportional to the speed of the turbine shaft and in consequence thereof proportional to the frequency of the alternating voltage produced by the generator 2. To the terminals of the tachometer dynamo a contact voltmeter is connected which indicates more or less voltage according to the number of revolutions. The contacts of the voltmeter are connected with the coils of the change-over relay $d^1$ and $g^1$, into which is fed an auxiliary current which is switched in when contact is made at the contact voltmeter $c^1$. Each relay $d^1$ and $g^1$ is provided with a magnet coil, a movable armature, two operating contacts and two rest contacts respectively. If, for instance, the high voltage contact of the voltmeter $c^1$ in consequence of an increase in the number of revolutions has cut in the auxiliary current, the armature of the relay $d^1$ is attracted and the rest contacts of the relay open and the operating contacts close. By this operation a second auxiliary circuit is closed, so that the operating coil $v^1$ of the switch $r^1$ is energized. In the same manner the relay $g^1$ is energized by the low voltage contact of the voltmeter $c^1$ and the relays $s^1$ by energizing the relay $o^1$, so that the contacts $l^1$ close. Another coil $w^1$ is arranged on the switching bar of the switch $r^1$. The coil $w^1$ is energized when one of the relays $f^1$ or $h^1$, connected to the contacts of the contact wattmeter $e^1$, closes its operating contacts. The end of the switching bar of the switch $r^1$ is connected to one arm of a pivoted lever $u^1$, the other arm of which connects the stationary contact $z^1$ with the plus pole of the auxiliary direct current supply, when the switch $r^1$ is in its left hand position. In the middle and in the right hand positions of the switch $r^1$, as indicated in stations II and III, the electrical connection between the plus pole of the auxiliary direct current supply and the stationary contact $z^1$ is interrupted. Switch $r^1$ is an auxiliary switch for the selection of the desired elements actuating the controlling member $p^1$ by means of the motor $m^1$. Such controlling elements are the frequency regulator $b^1$, the schedule power regulator $a^1$ (which is represented in detail in Fig. 3), the no-load contact wattmeter $i^1$ and the contact wattmeter $e^1$.

$b^1$ is a frequency regulator which regulates the number of revolutions of the machine for the normal frequency of the alternating current system. This regulator acts substantially as the well known speed regulators nowadays in use. It is connected with the tachometer dynamo $t^1$ and in consequence thereof a voltage proportional to the frequency of the generator 2 is supplied to the regulator. When the frequency is increased above or decreased below its normal value, the regulator connects the battery by means of one of its contacts and the switch $r^1$ with the motor $m^1$, so that the controlling member $p^1$ is actuated in such manner that the amount of steam required to correct the frequency is fed into the turbine $l$.

The schedule power regulator $a^1$ is shown more specifically in Fig. 3 and will be described hereinafter. The regulator $a^1$ is connected to the right hand stationary contacts of the switch $r^1$. When the switch $r^1$ is in its right hand position, as shown in stations II or III, and the regulator $a^1$ closes one of its contacts, current is supplied to the motor $m^1$ from a battery through the switch $r^1$, so that the controlling member $p^1$ is actuated in the sense prescribed by the regulator $a^1$.

The no-load contact wattmeter $i^1$ is a normal wattmeter with two contacts for limiting the no-load output. This wattmeter is inserted in the line for measuring the output, which the machine delivers to the net, and by means of its two contacts keeps constant the no-load output prescribed for the machine. The contact wattmeter $e^1$ is also a normal wattmeter which indicates the output of the machine. It is provided with a minimum and a maximum contact which are connected with the relays $f^1$ and $h^1$ respectively. In this manner the upper and lower limits of the machine are supervised, because when these limits are overstepped or understepped, the relay $f^1$ or the relay $h^1$ is energized and closes the circuit of the magnet coil $w^1$, so that the switch $r^1$ is changed over, as described more fully hereinafter. The resistor $k^1$ is normally short circuited by the power contacts $l^1$ of the relay $o^1$, connected to a third contact of the voltmeter $c^1$.

The other stations and the units forming part thereof are supplied with a similar outfit. The hydraulic power stations illustrated in Figs. 2 and 2$^a$ are also provided with such an outfit, however in this case the steam turbine is replaced by a water turbine. In the drawings similar references are used for similar instruments and apparatus in the stations II and III, as in the station I. In order to distinguish the instruments of the single stations, the instruments of the stations I, II, III carry the indices 1, 2, 3 respectively. For the sake of clearness each station is shown with a single unit only. It has been assumed that the stations I and III supply power for the normal load in accordance with a schedule, for instance the time table of a railway system, while the station I supplies power for the peak load. Consequently, in the station I the frequency must be regulated within the limits of the capacity of the station, independently of the load, and in the stations II and III the output must be regulated independently of the frequency in conformity with the schedule.

The output fed by the single stations are continuously measured by means of the contact wattmeters $e^1$, $e^2$, $e^3$ and controlled by the maximum and minimum contacts of these instruments. The minimum contacts cause the respective machines to be cut in for regulation under no-load conditions, that is, when the load on the machines has become nil accidentally or in accordance with the schedule, and this regulation is effected by the contact wattmeters $i^1$, $i^2$ and $i^3$, respectively.

The maximum contacts in the several meters $e^1$, $e^2$, $e^3$ effect the change from peak load and speed regulation to normal load regulation, when the load limit of a machine is exceeded by the load on the system and another machine must handle the excess load and regulate its speed. Preferably, the maximum contact in each meter $e^1$, $e^2$, $e^3$ limits the available maximum peak load with speed regulation, and switches the peak-load machine for power regulation as soon as the maximum for which the contact is set, has been attained. In the case of power regulation, the maximum contacts are as a rule adjusted automatically in conformity with the limiting contacts of the regulators $a^1$, $a^2$, $a^3$. Automatic setting of the maximum contacts to maximum position is effected only in case of a disturbance, such as overloading of the peak-load station I.

Assuming now that the load on the system $q$ has been reduced so that the peak-load station I is under no-load, the pointer of the wattmeter $e^1$ touches the minimum contact so that the relay $h^1$ is energized. The operating contacts of the relay $h^1$ are closed and a magnet coil $w^1$ is energized by a current flowing from the plus pole of the auxiliary direct current supply through contact $z^1$, operating contacts of relay $h^1$, rest contacts of the relays $g^1$, $b^1$, $s^1$, coil $w^1$ to the minus pole of the direct current supply. The switch $r^1$ is then moved to the right until it reaches the middle position, because now the current circuit is interrupted at contact $z^1$. The switch $r^1$ is now changed over to the no-lead contact wattmeter $i^1$. On further reduction of the load the frequency in the system will increase, as the stations II and III supply the power required for the load independently of the frequency by means of the regulators $a^2$ and $a^3$, say station II, effects the frequency regulation in accordance with the schedule. Due to the increase of frequency the contact volt meters $c^1$, $c^2$, $c^3$ which are connected with the tachometer dynamos, make contact, causing the time relays $d^1$, $d^2$ and $d^3$ to respond and to throw over the switches $r^1$, $r^2$ and $r^3$ in conformity with their timing. The timing is, for instance, one second for relay $d^1$, two seconds for relay $d^2$ and three seconds for relay $d^3$. After relay $d^1$ has been energized, no operating circuit can be closed in station I, since relay $a^1$ is still in its energized position. Therefore switch $r^1$ remains in its middle position. Two seconds after the voltmeters $c^1$, $c^2$ and $c^3$ have closed their contacts, relay $d^2$ closes its operating contacts so that the current flows from the plus pole of the direct current supply through rest contacts of relay $h^2$, relay $f^2$, operating contacts of relay $d^2$ and operating coil $v^2$ to the minus pole of the direct current supply. Coil $v^2$ is now energized and switch $r^2$ is changed over in its left hand position. Power station II is now connected with speed regulator $b^2$, and effects the frequency regulation within its capacity limits independently of the power available at the time. When normal frequency has been attained again, the voltmeters $c^1$, $c^2$, $c^3$ return to their zero positions and cut out the relays $d^1$, $d^2$, $d^3$.

Assuming now the load to increase to such an extent that power station II is operating at the scheduled output and station I must again effect the frequency regulation, as provided by the schedule, the pointer of the wattmeter $e^2$ touches its upper contact and energizes relay $f^2$, a circuit being closed from the plus pole of the direct current supply through operating contacts of relay $f^2$, rest contacts of the relays $g^2$, $d^2$, $s^2$ and magnet coil $w^2$ to the minus pole of the direct current supply. Coil $w^2$ is now energized and switch $r^2$ changed over to its right hand position, so that station II is switched back to the schedule regulator $a^2$. In a similar manner in station III relay $f^3$ is energized by wattmeter $e^3$ so that coil $w^3$ is energized and switch $r^3$ maintained in its position. As the load increases further, the frequency in the system will decrease, causing the voltmeters $c^1$, $c^2$, $c^3$ to make contact, and the time relays $g^1$, $g^2$, $g^3$ to respond, in accordance with their timing, the timing being, for instance, three seconds for $g^1$, two seconds for $g^2$ and one second for $g^3$. Consequently the relay $g^3$ in station III attracts its armature after one second, but a circuit is not closed thereby, since relay $f^3$ is still energized. Therefore station III remains switched in for load regulation. Two seconds after the voltmeters $c^1$, $c^2$, $c^3$ have closed their contacts a similar transaction will take place in station II, and, after three seconds, in station I coil $v^1$ is energized by relay $g^1$ so that switch $r^1$ is changed back to the frequency regulator $b^1$. Station I re-establishes normal frequency and the time relays $g^1$, $g^2$, $g^3$ will return to their zero positions as they are cut out by the voltmeters $c^1$, $c^2$, $c^3$ in their zero positions.

In order to gauarantee the complete utilization of all the power available beyond normal in case of disturbances or overload on the system, means are provided for displacing the maximum contact of the meters $e^1$, $e^2$, $e^3$ independently of the schedule, but in proportion to the reduction of voltage or to the increase of current in the overloaded system, until the maximum output of all power plants has been attained.

If cooperation as to the utilization of spare power in the several stations has been agreed upon by contract or otherwise, time relays $o^1$, $o^2$ and $o^3$, with switches $l^1$, $l^2$, $l^3$ and resistances $k^1$, $k^2$ and $k^3$, are provided which are timed in accordance with such contracts and are operated by further contacts in the voltmeters $c^1$, $c^2$, $c^3$. By these means, for instance, an "artificial" reduction of voltage is effected by which the maximum contacts in the meters $e^1$, $e^2$ and $e^3$ are moved in succession into their maximum final positions. At the same time the time relays $o^1$, $o^2$ and $o^3$, in accordance with their timing, throw the predetermined machine over to frequency regulation by means of the relays $s^1$, $s^2$, $s^3$. In those stations in which the maximum contacts of $e^1$, $e^2$ and $e^3$ are released by reduction of voltage, the contacts are returned to their scheduled position after the disturbance has been removed. $e$ max. can never drop below $a$.

Instead of timed regulation as described above by way of example, a predetermined frequency range may be imparted to each power station with the same result.

If it is desired to measure the output, the variables of the engines, such as steam consumption, water rate, and other values may be measured. This shall be explained by way of example with reference to Fig. 2 and Fig. 2$^a$, where a system comprising three hydraulic power stations I, II, III is illustrated. Station III is shown in Fig. 2$^a$. The bus bars $q$ shown in Fig. 2 and Fig. 2$^a$ are connected with each other. The functions of the several power stations are the same as those of the stations illustrated in Fig. 1, and their equipment is substantially similar to that described.

The power developed in a hydraulic turbine is directly proportional to the water supply Q and the head H, the water supply Q being directly proportional to the water speed at uniform pipe area, the head H being directly proportional to the gauge pressure. For the sake of simplicity efficiency and other values will not be considered. With this assumption the problem may be solved for instance as follows:

The water supply Q is measured by any suitable means, in the present instance by a small auxiliary turbine $y^1$, $y^2$, $y^3$ in each plant operating a tachometer dynamo $t^1$, $t^2$, $t^3$, respectively. The voltage is directly proportional to the number of revolutions and consequently to the speed or quantity of the water.

The head H or its gauge pressure is applied to regulating resistances $x^1$, $x^2$, $x^3$, the several steps of the resistance being proportional to the head, so that the product Q, H remains practically constant. The tachometers dynamos $t^1$, $t^2$, $t^3$, the resistances $x^1$, $x^2$, $x^3$ and the contact measuring instruments $a^1$, $a^2$, $a^3$, $e^1$, $e^2$, $e^3$ and $i^1$, $i^2$, $i^3$, are connected in series. These instruments are similar to those described with reference to Fig. 1.

The operation is as follows:

The product Q, H must correspond to the output at the time. If Q or H vary and if constant output is required, the controls of the units will be regulated for constant output. Assuming the load on the system to decrease until the peak-load station I is under no load, switch $r^1$ is changed over to the no-load contact wattmeter $i^1$ by means of relay $h^1$ and the frequency in the system will increase, as stations II and III supply the power required by the load, independently of the frequency, by means of their regulators $a^2$ and $a^3$. Frequency regulation should now be taken charge of by the station predetermined by the schedule, for instance station II. In consequence of increasing frequency the contact speedometers $c^1$, $c^2$ and $c^3$ cause the timed relays $d^1$, $d^2$ and $d^3$ (which are similar to those described with reference to Fig. 1) to throw over the switches $r^1$, $r^2$, $r^3$ in accordance with their timing. The timing is, for instance, one second for $d^1$, two seconds for $d^2$, and three seconds for $d^3$. Consequently the switch $r^1$ of the peak-load station will remain in the position in which no load regulation takes place, station II will be thrown over to the speed regulator $b^2$ and will now regulate the frequency within the limits of its capacity independently of the power available at the time. At normal frequency, all relays will return to zero position.

Now assuming the load on the system to increase to such an extent that station II operates up to the schedule and station I must again take charge of the frequency regulation in accordance with the schedule, then station II is switched to the schedule power regulator $a^2$ by the wattmeter $e^2$, which has an upper contact adjusted for schedule power, and by means of the relay $f^2$ and the switch $r^2$. When the load increases further, the frequency in the system will decrease and in consequence thereof the speedometers $c^1$, $c^2$ and $c^3$ will make contact, causing the change-over relays $g^1$, $g^2$ and $g^3$ to respond and to throw over the switches $r^1$, $r^2$ and $r^3$ in accordance with their timing which may be three seconds for $g^1$, two seconds for $g^2$, and one second for $g^3$. In consequence thereof $g^3$ will be energized after a second, but no operating circuit will be closed since relay $f^3$ still is energized by the maximum contact of the wattmeter $e^3$. Therefore station III remains switched to power regulation. The same transaction will take place in station II after two seconds and, after three seconds, station I will do the frequency regulation within the limits of its capacity.

With exclusively automatic operation it is preferable to operate the schedule power regulators $a^1$, $a^2$, $a^3$ by means of cams or similar means representing the load curves of the schedule, and to effect by similar means the further scheduled regulation of the operating variables influencing the generation of power.

A device for setting a schedule-power regulator is illustrated in Fig. 3. The device comprises a bell-crank lever 5, 12 which is fulcrumed at 6. A contact fork having contacts 7 and 8 is secured to the free end of the arm 5, and the indicator 9 which is controlled by one of the wattmeters $e^1$, $e^2$, $e^3$ is free to reciprocate between the contacts 7, 8 by which its stroke is limited. When contact is made at 7, a circuit, not shown, is completed which acts on the corresponding engine control $p^1$, $p^2$, $p^3$. When contact is made at 8, the load is reduced. The arm 5 is operated through the medium of the arm 12 which engages a cam 10 the configuration of which is determined in accordance with the schedule. Clockwork (not shown) is provided for rotating the cam, and in this manner the system is regulated altogether by automatic means.

A joint 13 is provided in the arm 12 by which the end of the arm can be placed out of reach of the cam 10 if it is desired to regulate the output by hand in case of semi-automatic regulation.

Obviously one or the other method of regulation may be applied separately.

A further application of the method described comprises, among others, the several factors for regulating the generation of power. For instance, if two independent distributing systems are connected by a power transmission line, the power to be delivered as required by contract or by schedule may be regulated by measuring at the point of delivery and by transmitting power to that station of the other system, which provides for the peak-load. Preferably the peak-load station of the principal system regulates the frequency and the principal power station of the subsidiary system regulates the supply for its own peak load in conformity with the schedule at the point of delivery. In this manner the method described above by way of example enables the traffic to be maintained or restarted. With the above method it is also possible to keep the two systems connected, if no exchange of power is desired, without one interfering with the operation of the other, so that each system constitutes a power reserve for the other system.

I wish it to be understood that I do not desire to be limited to the exact details of constructions shown and described for obvious modifications will occur to a person skilled in the art.

I claim:—

1. Means for the distribution of electrical energy comprising a system, two generators of electrical energy arranged to feed into said system, a motor for driving each generator and forming a unit therewith, each motor being independent from the other, two regulators for each unit, one being capable of keeping constant the load independently of the frequency, the other being capable of keeping constant the frequency independently of the load, and means for operatively connecting with each unit one or the other regulator.

2. Means for the distribution of electrical energy comprising a system, two generators of electrical energy arranged to feed into said system, a motor for driving each generator and forming a unit therewith, each motor being independent from the other, two regulators for each unit, one being capable of keeping constant the load independently of the frequency, the other being capable of keeping constant the frequency independently of the load, and automatically active means for operatively connecting with each unit one or the other regulator.

3. Means for the distribution of electrical energy comprising a system, two generators of electrical energy arranged to feed into said system, a motor for driving each generator and forming a unit therewith, each motor being independent from the other, two regulators for each unit, one being capable of keeping constant the load independently of the frequency, the other being capable of keeping constant the frequency independently of the load, and automatically active means for operatively connecting with each unit one or the other regulator, said means comprising an instrument responding to frequency.

4. Means for the distribution of electrical energy comprising a system, two generators of electrical energy arranged to feed into said system, a motor for driving each generator and forming a unit therewith, each motor being independent from the other, two regulators for each unit, one being capable of keeping constant the load independently of the frequency, the other being capable of keeping constant the frequency independently of the load, and automatically active means for operatively connecting with each unit one or the other regulator, said means comprising an instrument responding to variations of load.

5. Means for the distribution of electrical energy comprising a system, two generators of electrical energy arranged to feed into said system, a motor for driving each generator and forming a unit therewith, each motor being independent from the other, two regulators for each unit, one being capable of keeping constant the load independently of the frequency, the other being capable of keeping constant the frequency independently of the load, and automatically active means for operatively connecting with each unit one or the other regulator, said means comprising an instrument responding to frequency and an instrument responding to variations of load.

6. Means for the distribution of electrical energy comprising a system, two generators of electrical energy arranged to feed into said system, a motor for driving each generator and forming a unit therewith, each motor being independent from the other, two regulators for each unit, one being capable of keeping constant the load independently of the frequency, the other being capable of keeping constant the frequency independently of the load, automatically active means for operatively connecting with each unit one or the other regulator and means for timing the action of said automatic means.

7. Means for the distribution of electrical energy comprising a system, two generators of electrical energy arranged to feed into said system, a motor for driving each generator and forming a unit therewith, each motor being independent from the other, two regulators for each unit, one being capable of keeping constant the load independently of the frequency, the other being capable of keeping constant the frequency independently of the load, automatically active means for operatively connecting with each unit one or the other regulator and automatically active means for setting in a predetermined manner said automatic connecting means.

In testimony whereof I affix my signature.

WALTER SPENNEMANN.